(12) United States Patent
Van Dingenen et al.

(10) Patent No.: US 11,247,563 B2
(45) Date of Patent: Feb. 15, 2022

(54) VEHICLE TRANSMISSION WITH AN INTER-AXLE DIFFERENTIAL AND METHOD FOR OPERATION OF SAID INTER-AXLE DIFFERENTIAL

(71) Applicant: Dana Belgium N.V., Bruges (BE)

(72) Inventors: Joachim Van Dingenen, Drongen (BE); Jessica Versini, Bruges (BE); Marc Van Tomme, Roeselare (BE); Bert Hannon, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 16/882,228

(22) Filed: May 22, 2020

(65) Prior Publication Data

US 2021/0362593 A1  Nov. 25, 2021

(51) Int. Cl.
| | |
|---|---|
| *B60K 23/08* | (2006.01) |
| *B60K 25/06* | (2006.01) |
| *B60K 17/16* | (2006.01) |
| *B60K 6/365* | (2007.10) |
| *F16H 48/36* | (2012.01) |
| *F16H 3/72* | (2006.01) |
| *B60K 17/344* | (2006.01) |

(Continued)

(52) U.S. Cl.
CPC ............ *B60K 23/0808* (2013.01); *B60K 6/52* (2013.01); *B60K 17/344* (2013.01); *B60K 17/356* (2013.01); *B60K 25/06* (2013.01); *F16H 48/36* (2013.01); *B60K 17/08* (2013.01); *B60K 17/16* (2013.01); *B60K 2023/0858* (2013.01); *B60Y 2200/92* (2013.01); *B60Y 2400/73* (2013.01); *B60Y 2400/82* (2013.01); *F16H 2048/364* (2013.01)

(58) Field of Classification Search
CPC .... B60K 23/0808; B60K 6/52; B60K 17/344; B60K 17/356; B60K 17/08; B60K 17/16; B60K 25/06; B60K 2023/0858; B60Y 2200/92; B60Y 2400/73; B60Y 2400/82; F16H 48/36; F16H 2048/364
See application file for complete search history.

(56) References Cited

U.S. PATENT DOCUMENTS

| | | |
|---|---|---|
| 4,860,612 A | 8/1989 | Dick et al. |
| 6,533,693 B2 | 3/2003 | Bowen et al. |

(Continued)

FOREIGN PATENT DOCUMENTS

| | | |
|---|---|---|
| WO | 2009147501 A2 | 12/2009 |
| WO | 2017049049 A1 | 3/2017 |

*Primary Examiner* — Tisha D Lewis
(74) *Attorney, Agent, or Firm* — McCoy Russell LLP

(57) ABSTRACT

Methods and systems for a vehicle transmission are provided. In one example, a vehicle transmission system is provided that includes a first planetary gear set rotationally coupled to a second planetary gear set, a first electrical machine rotationally coupled to a sun gear in the first planetary gear set, and a second electrical machine rotationally coupled to a sun gear in the second planetary gear set. The transmission system also includes an inter-axle differential including a third planetary gear set rotationally coupled to a first axle and a second axle and selectively rotationally coupled to the first planetary gear set and the second planetary gear set, wherein the inter-axle differential is configured to selectively enable and disable speed differentiation between the first and the second axles.

14 Claims, 4 Drawing Sheets

(51) Int. Cl.
*B60K 17/356* (2006.01)
*B60K 6/52* (2007.10)
*B60K 17/08* (2006.01)

(56) References Cited

U.S. PATENT DOCUMENTS

| | | | |
|---|---|---|---|
| 7,100,717 B2 * | 9/2006 | Stancu | B60L 50/16 |
| | | | 180/65.1 |
| 7,282,003 B2 * | 10/2007 | Klemen | B60K 6/365 |
| | | | 475/5 |
| 7,908,063 B2 * | 3/2011 | Sah | B60K 6/547 |
| | | | 701/51 |
| 8,215,440 B2 | 7/2012 | Hoffman et al. | |
| 9,650,032 B2 | 5/2017 | Kotloski et al. | |
| 10,023,184 B2 | 7/2018 | Hartz et al. | |
| 10,160,438 B2 | 12/2018 | Shukla et al. | |
| 10,392,000 B2 | 8/2019 | Shukla et al. | |
| 10,457,134 B2 | 10/2019 | Marrow et al. | |
| 2002/0088291 A1 | 7/2002 | Bowen | |
| 2007/0170030 A1 | 7/2007 | Yamazaki et al. | |
| 2007/0256870 A1 * | 11/2007 | Holmes | B60W 10/06 |
| | | | 180/65.26 |
| 2010/0051361 A1 * | 3/2010 | Katsuta | B60W 10/02 |
| | | | 180/65.23 |
| 2011/0179906 A1 | 7/2011 | Juenemann et al. | |
| 2018/0031085 A1 | 2/2018 | Steinberger et al. | |
| 2018/0326832 A1 | 11/2018 | Kotloski et al. | |
| 2019/0178350 A1 | 6/2019 | Steinberger et al. | |
| 2019/0242460 A1 | 8/2019 | Morrow et al. | |
| 2019/0291711 A1 | 9/2019 | Shukla et al. | |
| 2019/0381990 A1 | 12/2019 | Shukla et al. | |

\* cited by examiner

VEHICLE TRANSMISSION WITH AN INTER-AXLE DIFFERENTIAL AND METHOD FOR OPERATION OF SAID INTER-AXLE DIFFERENTIAL

FIELD

The present disclosure relates to a transmission in a vehicle with an inter-axle differential and methods for operating the inter-axle differential.

BACKGROUND

Vehicle transmissions deliver torque to vehicle drive axles. Infinitely variable style transmissions are deployed to vary the transmission's gear ratio with continuity. Infinitely variable transmissions provide a relatively high degree of adaptability and allow the gear reduction to be adjusted to independently control the input speed from the output speed.

However, the inventors have recognized several drawbacks with vehicle transmissions and more specifically infinitely variable transmissions. Previous infinitely variable transmissions, for example, have included a single mechanical power take-off interfacing with a mechanical accessory. Certain transmissions with a single mechanical power take-off may not be able to concurrently drive multiple vehicle accessories. Furthermore, drivetrains incorporating a single mechanical power take-off have exhibited space inefficiencies. Previous infinitely variable transmission have also exhibited drawbacks with regard to front-rear axle speed differentiation.

SUMMARY

To overcome at least some of the aforementioned drawbacks a vehicle transmission system is provided. The vehicle transmission system includes, in one example, a first planetary gear set rotationally coupled to a second planetary gear set. The system further includes a first electrical machine rotationally coupled to a sun gear in the first planetary gear set. The system also comprises a second electrical machine rotationally coupled to a sun gear in the second planetary gear set. The system additionally includes an inter-axle differential including a third planetary gear set rotationally coupled to the first axle and the second axle and selectively rotationally coupled to the first planetary gear set and the second planetary gear set. The inter-axle differential is designed to selectively allow and inhibit speed differentiation between the first and second axle. In this way, the vehicle transmission system may avoid parasitic forces and losses, if desired. The adaptability of the transmission system is further expanded as a result.

In another example, the vehicle transmission system may further include a first mechanical power take-off rotationally coupled to an input shaft through a countershaft gear. In such an example, the system may also include a second mechanical power take-off coupled to a clutch configured to rotationally couple and decouple the second planetary gear set from the second mechanical power take-off. In this way, multiple mechanical power take-offs may be provided in the transmission system to permit different accessories to be driven via power from the engine as well as one or both of the electrical machines, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle transmission with multiple planetary gear sets designed with a comparatively high degree of gear ratio variation for multiple vehicle drive axles is described herein. The transmission may, for instance, be an electro-mechanical infinitely variable transmission (EMIVT) designed to provide a neutral gear and a continuous ratio change with regard to input-to-output speed, in one example. EMIVTs reduce power demand on the motor-generators. The transmission, in one example, may include an inter-axle differential (IAD) designed to selectively allow for speed differentiation between the different drive axles. In this way, the transmission may allow for speed differentiation between front and rear drive axles, during some operating conditions. During other operating conditions, (e.g., when the vehicle experiences a variance in friction coefficients of the front and rear wheels or responsive to receiving driver input indicating a request to lock the IAD), the inter-axle differential in the transmission may be adjusted to inhibit speed differentiation between the front and rear axles and maintain a desired amount of vehicle traction. Pairing the inter-axle differential with an EMIVT has the benefit of increasing the vehicle's performance while maintaining packaging, efficiency and controllability. The transmission may include, in another example, a first mechanical power take-off (PTO) rotationally coupled to the transmission's input and a second mechanical PTO coupled to a second planetary gear set. Providing multiple PTOs in the transmission allows transmission adaptability to be increased. For instance, the first and second mechanical PTOs may be utilized to power accessories with different rotational input needs. Consequently, two accessories may be efficiently driven by the transmission in tandem, in some embodiments.

Figure 1:
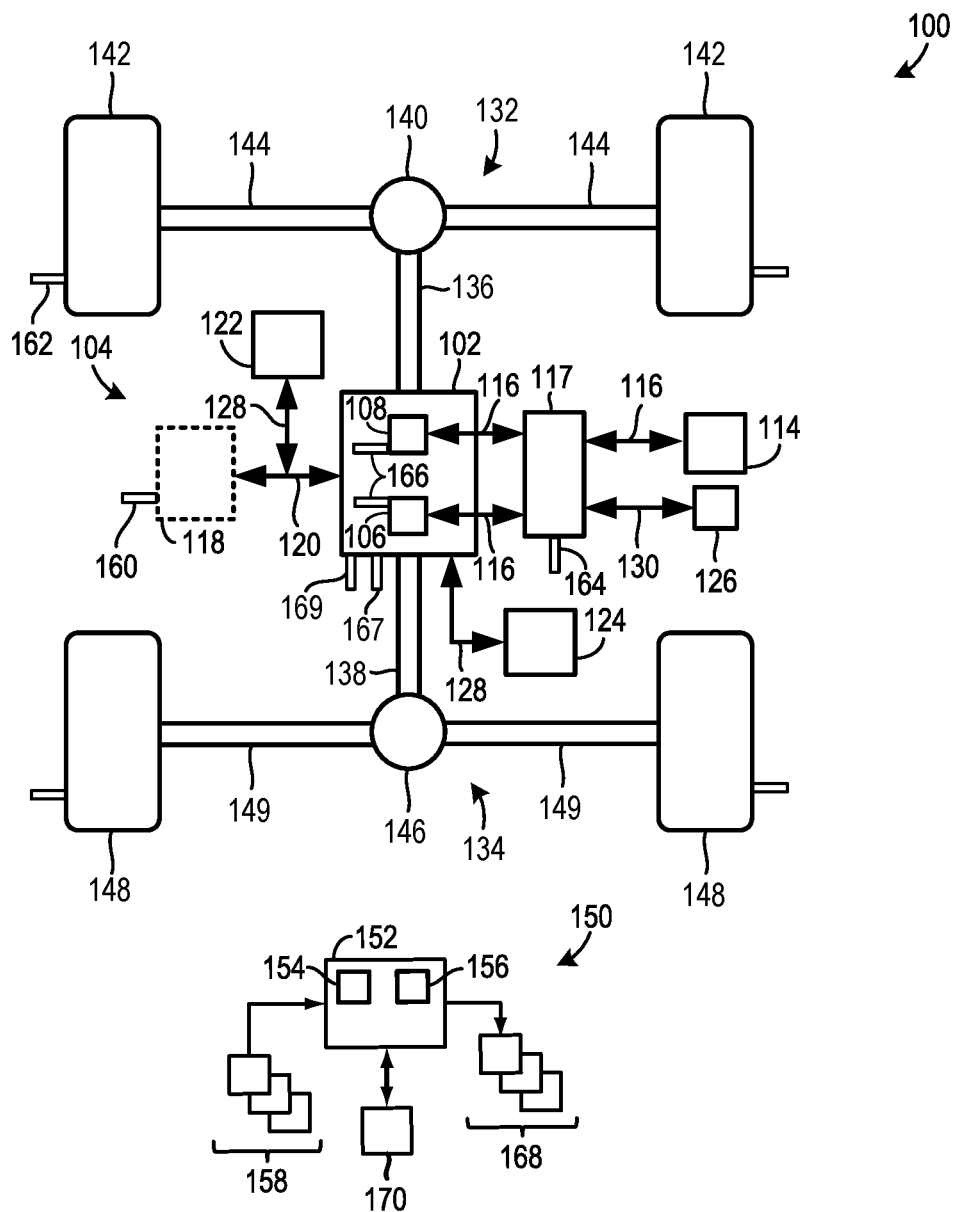
FIG. 1 is a schematic representation of a vehicle including a transmission.
Figure 2:
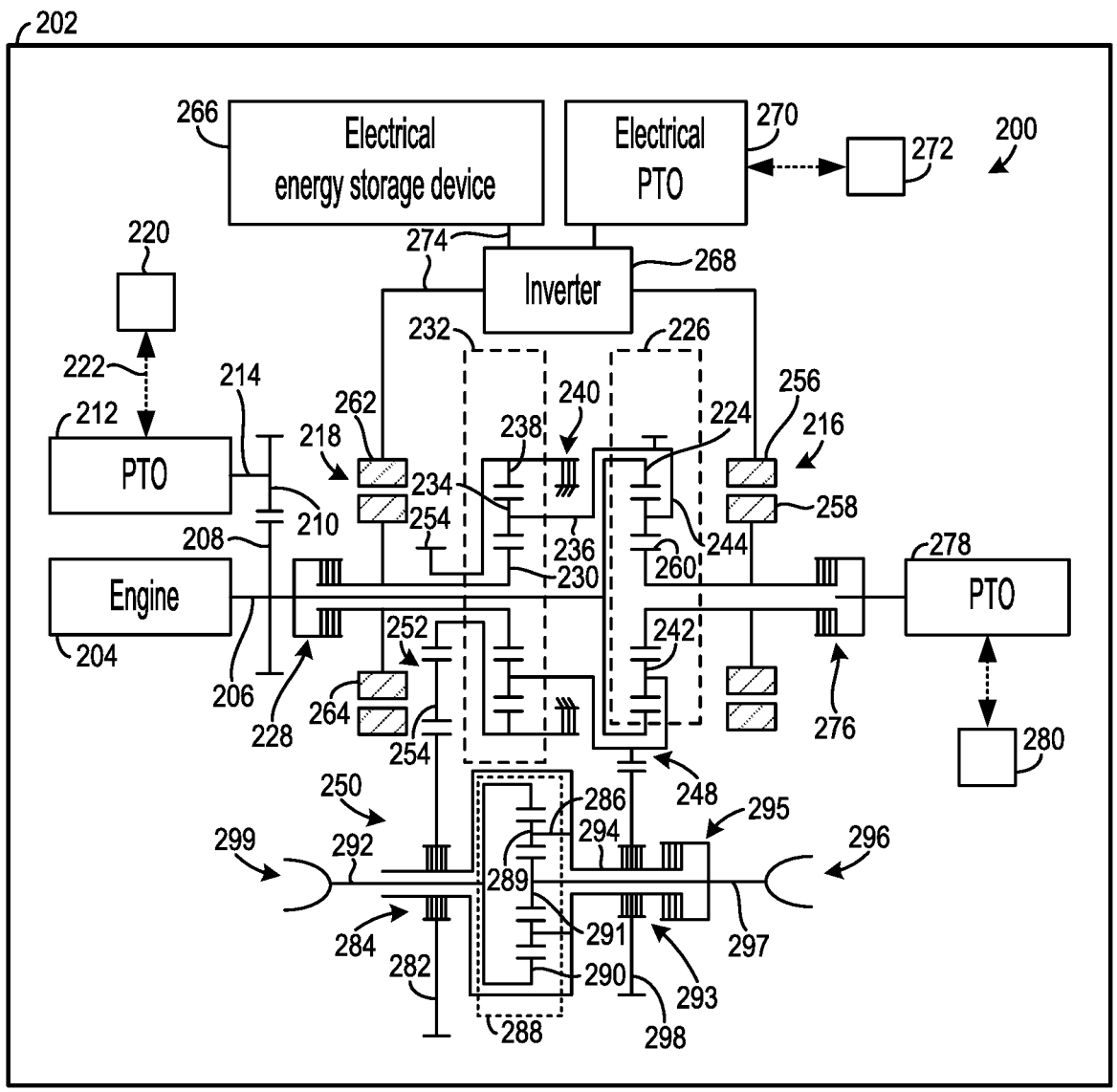
FIG. 2 shows a stick diagram of a first embodiment of a vehicle transmission system.
Figure 3:
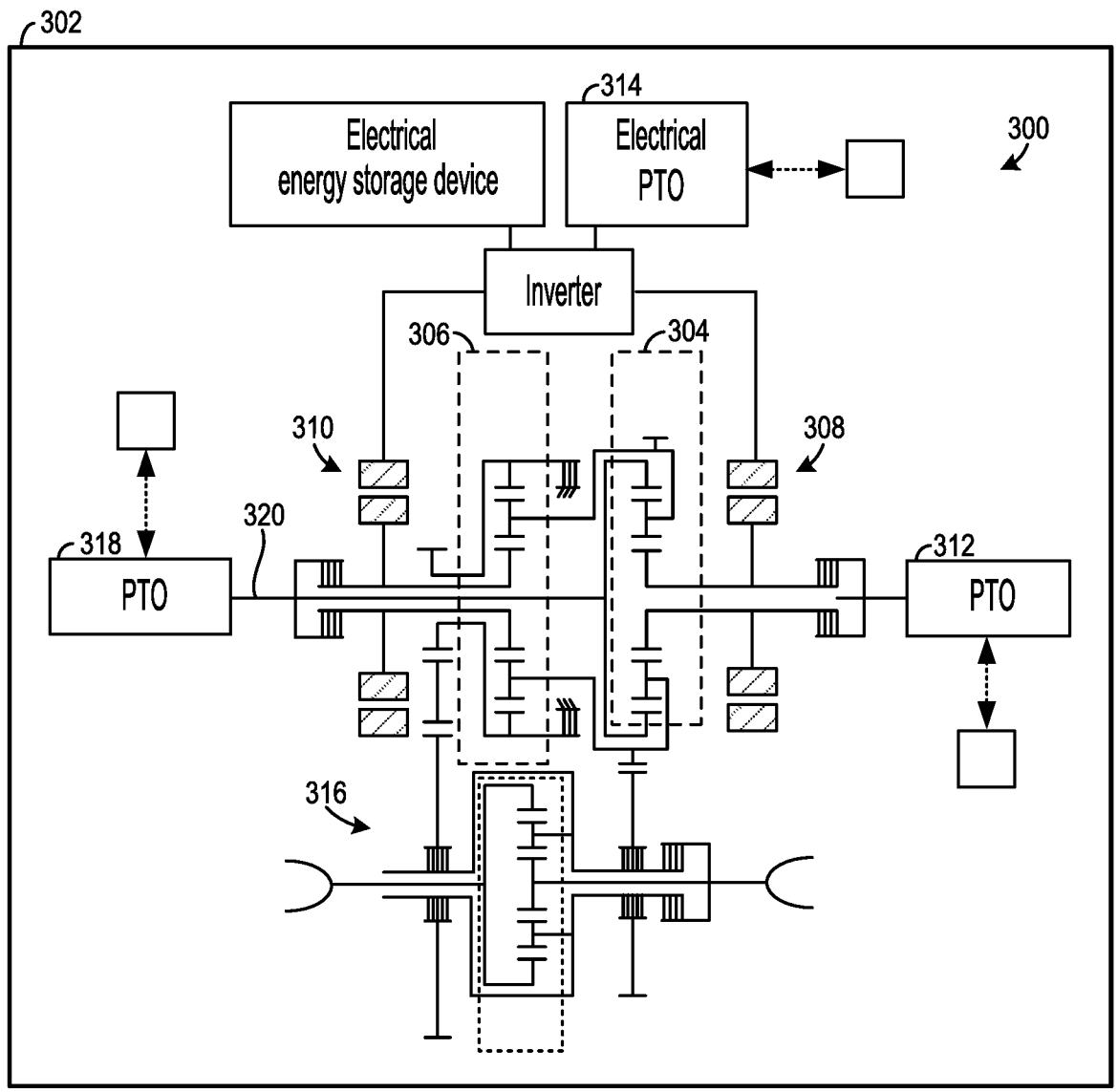
FIG. 3 shows a stick diagram of a second embodiment of a vehicle transmission system.
Figure 4:
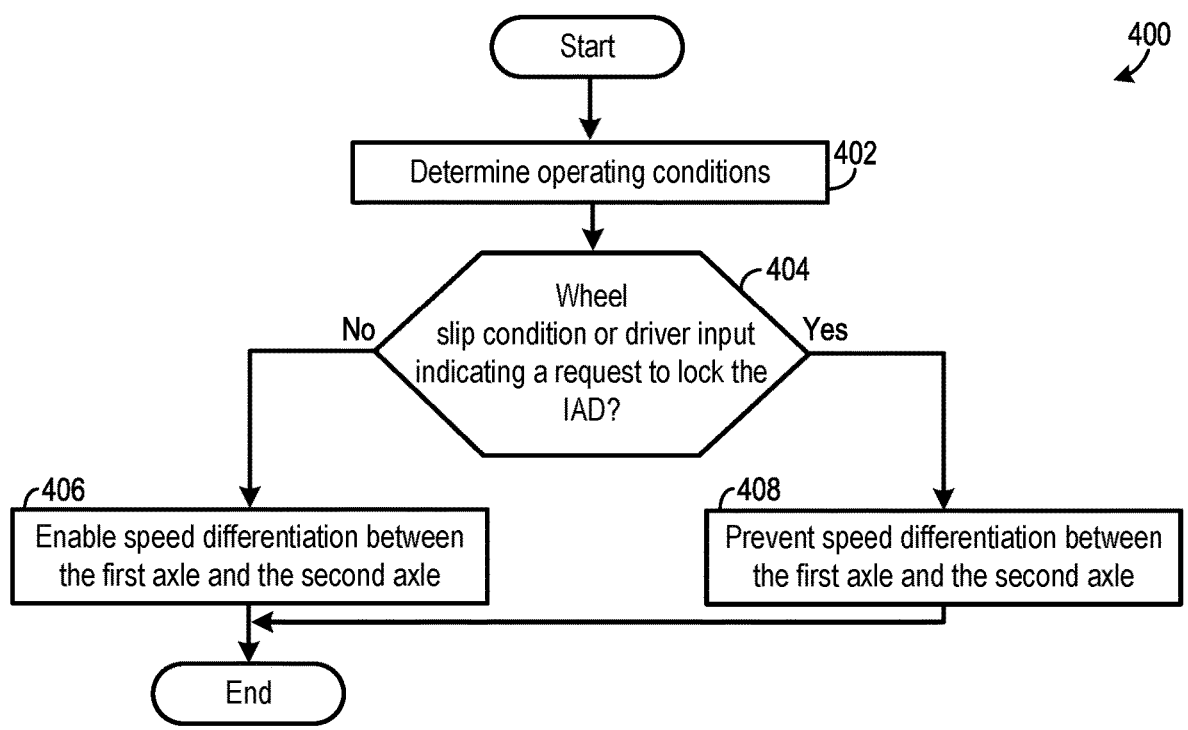
FIG. 4 shows a method for operation of an inter-axle differential (IAD) in a vehicle transmission.

FIG. 1 illustrates a high-level schematic depiction of a vehicle with a transmission having a relatively large amount of speed variance adjustability. FIG. 2 depicts a stick diagram of a first example of a transmission system in a hybrid vehicle with an IAD and multiple PTOs, providing expanded accessory attachment capabilities. FIG. 3 depicts a stick diagram of a second example of a transmission system in a battery electric vehicle (BEV) again with an IAD and a plurality of PTOs, providing a greater variety of accessory attachment options. FIG. 4 illustrates a method for operating an IAD to increase vehicle traction.

FIG. 1 shows a schematic depiction of a vehicle 100 including a transmission 102 in a transmission system 104. The transmission 102 may be an EMIVT designed to provide an infinite input-output rotational speed variance, in one example. To achieve this infinite speed variance functionality the EMIVT may include a pair of planetary gear sets, two electrical machines, and a plurality of clutches, described in greater detail herein with regard to FIG. 2.

The transmission 102 may include a first electrical machine 106 and a second electrical machine 108, each designed to provide rotational energy to and/or receive rotational energy from planetary gear sets, described in greater detail herein. To accomplish the aforementioned rotational energy transfer functionality, the first and second electrical machines 106, 108 may include rotors and stators electromagnetically interacting with one another to rotate a transmission interface and/or generate electrical energy responsive to receiving input from the transmission interface. Specific exemplary configurations of the electrical machines are described in greater detail herein with regard to FIG. 2. As described herein the term exemplary is not intended to give any indication of preference but rather indicates one potential aspect of the corresponding feature.

It will be understood that the transmission system 104 includes clutches that may be placed in different states to adjust the transmission mode. The transmission modes may include an ultra-low, a low, a medium, and a high mode, in one use-case example.

The first and second electrical machines 106, 108 may be electrically coupled to an electrical energy storage device 114 (e.g., battery, capacitor, combinations thereof, and the like). However, in other examples, the electrical energy storage device may be omitted from the transmission system 104. Arrows 116 denote the electrical energy transfer between the electrical energy storage device 114, an inverter 117, and the electrical machines 106, 108. It will be appreciated that wired and/or wireless energy transfer devices may be used to accomplish this electrical energy transfer. To elaborate, electrical components such as the inverter 117, wires (e.g., high voltage wires), and the like may enable electrical energy transfer between the first and second electrical machines 106, 108 and the electrical energy storage device 114.

The vehicle 100 may also include an internal combustion engine 118 designed to transfer rotational energy to the transmission 102 and/or receive rotational energy from the transmission. Arrow 120 denotes said rotational energy transfer. The internal combustion engine 118 may include conventional components designed to carry out combustion cycles (e.g., four stroke combustion cycles) including one or more cylinders, an intake system, an exhaust system, valves, a fuel delivery system, an emissions control system, etc. Both compression and spark ignition engines have been contemplated.

The vehicle 100 may take a variety of forms, in different embodiments. For example, the vehicle 100 may be a hybrid vehicle where both the first and second electrical machines 106, 108 and the internal combustion engine 118 are used for motive power generation. For instance, in one use-case hybrid vehicle configuration, the internal combustion engine 118 may assist in recharging the electrical energy storage device 114, during certain conditions. In another use-case hybrid vehicle configuration, the internal combustion engine may provide rotational energy to the wheels. Further, in such an example, the electrical machines 106, 108 may provide rotational energy to the wheels in tandem with the engine 118, or at distinct time intervals, in another example. Further, in other examples, the vehicle may be a battery electric vehicle (BEV) where the internal combustion engine is omitted.

The transmission 102 is designed to receive power input from the internal combustion engine 118 and the electrical energy storage device 114 by way of the first and second electrical machines 106, 108. Additionally, the transmission 102 may be designed to output power to a first mechanical PTO 122, a second mechanical PTO 124, and/or and an electrical PTO 126. Thus, the transmission system 104 may include any combination of the first mechanical PTO 122, the second mechanical PTO 124, and the electrical PTO. It will be appreciated that the power flows between the engine 118, the first electrical machine 106, the second electrical machine 108, the first mechanical PTO 122, the second mechanical PTO 124, and the electrical PTO 126 may also be zero and reversible, in certain embodiments. In other words, power can be taken from the transmission's outputs as well as sent back to the engine and electrical machines, in some cases. The forward and reversible power transfer between the mechanical PTOs 122, 124 and the corresponding components is denoted via arrows 128. Gears, clutches, and/or other suitable power transfer mechanisms may be deployed to carry out the mechanical power transfer. The forward and reverse power transfer between the electrical PTO 126 and the inverter 117 is denoted via arrows 130. Cables, circuits, etc. may be used for the electrical power transfer.

The transmission 102 is designed to transfer rotational energy to and/or receive rotational energy from a first axle 132 and a second axle 134 via a first shaft 136 and a second shaft 138, respectively. The axles receiving rotational input from the transmission may be referred to as drive axles. The first axle 132 may be a front axle and the second axle 134 may be a rear axle. However, in other examples, the first and second axles may be both rear axles or front axles.

The first axle 132 may include a first differential 140 transferring rotational energy between the transmission 102 and wheels 142 via axle shafts 144. It will be understood that the first differential 140 and a second differential 146 allow torque to be transferred from the IAD shafts 136, 138 to the drive wheels in respective axles. Thus, the second axle 134 may include the second differential 146 transferring rotational energy between the transmission 102 and wheels 148 via axle shafts 149. A variety of suitable differential styles for both differentials have been envisioned such as locking differentials, limited slip differentials, torque vectoring differentials, etc.

The vehicle 100 may also include a control system 150 with a controller 152. The controller 152 includes at least one processor 154 and memory 156. The memory 156 may hold instructions stored therein that when executed by the processor cause the controller 152 to perform the various methods, control techniques, etc., described herein. The processor 154 may comprise at least one microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled to various locations in the vehicle 100 and the transmission 102. The sensors may include an engine speed sensor 160, wheel speed sensors 162, energy storage device state of charge sensor 164, electrical machine speed sensors 166, temperature sensor 167, atmospheric pressure sensor 169, etc. Although the temperature and pressure sensors 167, 169 are shown coupled to the transmission 102, it will be appreciated that these sensors may be arranged in other suitable locations in the vehicle 100, in other embodiments. The controller 152 may also send control signals to various actuators 168 coupled at different locations in the vehicle 100 and the transmission 102. For instance, the controller 152 may, in one example, comprise instructions stored in the memory 156 causing the controller 152 to operate the first electrical machine 106 and the second electrical machine 108 in a speed, torque, or voltage control mode to support efficient (e.g., optimal) transmission operation. Additionally, in one example, the controller may also send control commands to clutches, brakes, etc. in the transmission 102 to increase (e.g., optimize) powerflow efficiency in the transmission. The other controllable components in the vehicle 100 and transmission 102 may function in a similar manner with regard to command signals and actuator adjustment. For instance, the controller may define speed, torque, and/or throttle set-points for the engine 118. The controller 152 may include instructions stored in a non-transitory memory to carry out the methods, control techniques, etc., described in greater detail herein.

The vehicle 100 may also include an input device 170 (e.g., a gear selector such as a gear stick, gear lever, etc., brake pedal, accelerator pedal, console instrument panel, touch interface, touch panel, keyboard, combinations thereof, etc.). The input device 170, responsive to driver input, may generate a mode request indicating a desired operating mode for the transmission. For instance, in a use-case example, the driver may shift the input device into a neutral or a high torque mode to generate a gear set modal transition request at the controller. In response, the controller 152 commands transmission components to place the transmission into the neutral or high torque mode. However, in other examples, the vehicle transmission 102 may be adjusted using more automated control strategies. In another example, the driver may place an input device into a locking configuration indicative of the driver's desire to prevent speed differentiation between the first and second axles 132, 134. Responsive to the driver placing the input device into the locking configuration, the IAD may be locked to prevent speed differentiation between the first and second axles. The IAD is described in greater detail herein.

FIG. 2 shows a transmission system 200 in a vehicle 202. It will be appreciated that the transmission system 200, shown in FIG. 2, serves as an example of the transmission system 104 and the vehicle 100 shown in FIG. 1. As such, at least a portion of the functional and structural features of the transmission system 104 shown in FIG. 1 may be embodied in the transmission system 200 shown in FIG. 2 or vice versa. Thus, the controller 152, shown in FIG. 1, may be included in the transmission system, shown in FIG. 2, and the other systems described herein, and send control commands to the controllable components and receive inputs from sensors and other system components.

The transmission system 200 may include an internal combustion engine 204 designed to implement combustion cycles and therefore may include conventional components such as cylinder(s), piston(s), valves, an intake system, an exhaust system, etc., generating rotational output or receiving rotational input from a first shaft 206 (e.g., input shaft). A first gear 208 may be rotationally coupled to the first shaft 206. As described herein, a gear is a rotating device that includes teeth meshing or otherwise rotationally coupling with teeth in a corresponding gear. The transmission system 200 may also include a second gear 210 rotational coupled to the first gear 208. The second gear 210 may provide input for a first mechanical PTO 212 via a PTO shaft 214 (e.g., countershaft). Further, in some examples, the first mechanical PTO 212 may be configured to deliver rotational input to the engine 204 and/or a first and a second electrical machine 216, 218. The first mechanical PTO 212 may also be designed to rotationally decouple from the engine 204 and/or electrical machines 216, 218. Thus, the first mechanical PTO 212 may include a disconnect clutch, in one example. The mechanical PTO disconnect clutch may be actuated via pneumatic, hydraulic, mechanical, and/or electric mechanisms, for instance. The first mechanical PTO 212 may include suitable components for delivering power to the accessories 220 such as gears, shafts, joints, chains, and the like. The ratio between the first and second gears 208, 210 may provide a desired speed change as an input for the first mechanical PTO.

The first mechanical PTO 212 may be rotationally coupled to one or more accessories 220, denoted via arrow 222. The accessories 220 may include a liquid pump, a vacuum pump, a blower, an air compressor, a bed lift, and the like. Additionally, the first mechanical PTO 212 is shown directly coupled to the engine 204 via the first and second gears 208, 210 without any intervening components therebetween. Arranging the first mechanical PTO 212 next to the engine 204 allows the accessories to be efficiently coupled to the engine 204 during engine use. However, in other examples, the transmission system 200 may include components other than the first and second gears 208, 210 between the internal combustion engine 204 and the first mechanical PTO 212.

A ring gear 224 in a first planetary gear set 226 is rotationally coupled to the first shaft 206. Thus, engine rotational output drives rotation of the ring gear 224 in the first planetary gear set 226 or vice versa. As described herein, a planetary gear set is a gear set with a ring gear coupled to planet gears rotating on a carrier. The planet gears are also coupled to a sun gear. Each of the aforementioned meshes enable rotational energy transfer therebetween.

A first clutch 228 is coupled to the first shaft 206. The first clutch 228 is designed to couple and decouple the first shaft 206 from a sun gear 230 in a second planetary gear set 232. To accomplish the coupling/decoupling functionality the first clutch 228 may include friction plates, hydraulic mechanisms, toothed interfaces, etc. For instance, the first clutch 228 may be a friction clutch with radially aligned friction plates, a dog clutch, a hydraulic clutch, and the like. The first clutch 228 and the other clutches described herein may be pneumatically actuated, hydraulically actuated, electrically actuated, combinations thereof. It will also be appreciated that the other clutches described herein may be designed with any of the aforementioned styles, features, etc. Additionally, in one example, at least a portion of the clutches in the transmission system 200 may have a similar design. However, in other examples, the configurations of the clutches may vary from clutch to clutch. Factors taken into account when selecting the style of clutches used in the system may include packaging goals, expected operating torque range, engine size, electrical machine size, etc.

The second planetary gear set 232 further includes planet gears 234 rotating on a carrier 236. The planet gears 234 are rotationally coupled to the sun gear 230 and a ring gear 238 in the second planetary gear set 232. A brake 240 may be coupled to the ring gear 238, in one example. The brake 240 is designed to modulate the rotational speed of the ring gear 238. Thus, the brake 240 may selectively limit the speed of the ring gear 238. To facilitate the speed modulation the brake 240 may include a friction device interacting with the ring gear 238 to slow the gear. The force applied by the friction device may be varied to adjust (e.g., continuously adjust or discretely adjust) the rotational speed of the ring gear. Various styles of brakes may be used in different use-case embodiments such as a band brake, a disk brake, a drum brake, and the like.

The first planetary gear set 226 additionally includes a plurality of planet gears 242 rotating on a carrier 244. The carrier 244 in the first planetary gear set 226 is rotationally coupled to the carrier 236 in the second planetary gear set 232. The carrier 244 in the first planetary gear set 226 also may include an interface 248 rotationally coupled to an IAD 250. It will be appreciated that the interface 248 includes a gear with teeth enabling the rotational energy transfer, in the illustrated example. However, other suitable interfaces have been contemplated such as interfaces with multiple gears or other suitable mechanical power transfer devices.

The second planetary gear set 232 also may include an interface 252 rotationally coupled to the IAD 250. Again, the interface 252 may comprise teeth facilitating the rotational coupling functionality. To elaborate, the interface 252 is shown comprising two gears 254. However, in other examples, the interface 252 may include one gear.

The first electrical machine 216 and the second electrical machine 218 may also be included in the transmission system 200. In one example, the first and second electrical machines 216, 218 may be designed to operate as a secondary starter for the engine 204. The first and second planetary gear sets 226, 232 may be axially interposed by the first and second electrical machines 216, 218.

The first electrical machine 216 includes a stator 256 and a rotor 258 coupled to a sun gear 260 of the first planetary gear set 226. Likewise, the second electrical machine 218 includes a stator 262 and a rotor 264 coupled to the sun gear 230 of the second planetary gear set 232. Each pair of rotors and stators in the electrical machines is configured to electromagnetically interact with one another to rotate the sun gear to which they are attached and generate electrical energy responsive to receiving rotational input from the sun gear. Thus, the stators 256, 262 and the rotors 258, 264 may include electromagnets, permanents magnets, etc., to achieve the aforementioned functionality.

A variety of suitable configurations for the first and second electrical machines 216, 218 may be used depending on the end-use design goals. For instance, the electrical machines may be an alternating current (AC) motor-generator. AC motor-generator types include asynchronous (e.g., squirrel cage and wound rotor) and synchronous style motors. Synchronous motor-generators such as one phase, three phase, more than three phases, etc. may be used in certain embodiments. The styles of synchronous motor-generators that may be deployed include permanent magnet, synchronous reluctance, hybrid synchronous (e.g., permanent magnet assisted synchronous reluctance), synchronous induction, and hysteresis. In one use-case scenario, an asynchronous motor-generator may be used due to its relatively low cost, low maintenance, and high efficiency. Continuing with the AC motor-generator use-case, a synchronous permanent magnet motor-generator may be utilized, in other instances, due to its relatively high conversion efficiency.

The first electrical machine 216 and the second electrical machine 218 may receive electric energy from an electrical energy storage device 266 by way of an inverter 268. The inverter 268 includes circuits and other components changing direct current (DC) to AC or vice versa depending on the direction of current flow. To elaborate, the inverter 268 may convert current flowing to the electrical energy storage device 266 from the electrical machines 216, 218 to DC current. Conversely, the inverter 268 may convert current flowing to the electrical machines 216, 218 from the electrical energy storage device 266 to AC current. The inverter 268 may be spaced apart from the electrical energy storage device 266. However, it will be appreciated that in other embodiments, the inverter 268 may be integrated into the electrical machines 216, 218 of the transmission system 200. The electrical energy storage device 266 may include batteries, capacitors, combinations thereof, and the like.

An electrical PTO 270 may also be coupled to the inverter 268. The electrical PTO 270 may comprise hardware such as electrical interfaces (e.g., sockets, plugs, capacitive charging devices, etc.) designed to electrically connect to one or more electrical accessories 272. The electrical accessories may include electrical pumps, electrical compressors, electrical tools, and the like and may be used as a generator for mobile electrical power generation, in certain instances.

The inverter 268, the electrical energy storage device 266, the electrical PTO 270, and the first and second electrical machines 216, 218 may be coupled via suitable wired and/or wireless energy transfer mechanisms, indicated via lines 274. To elaborate, an electrical system may be provided to transfer electrical energy between the first and second electrical machines 216, 218, the electrical energy storage device 266, and the electrical PTO 270. The electrical system may include the inverter, cables (e.g., high voltage cables), distribution boxes, etc.

The first and second planetary gear sets 226, 232 are, in the illustrated embodiment, positioned axially between the first and second electrical machines 216, 218. In this way, the transmission system may achieve a compact arrangement. Additionally, the engine's output shaft and rotational axes of the electrical machines 216, 218 and the planetary gear sets 226, 232 are coaxial, enabling system compactness to be further increased and allowing the transmission to be efficiently installed in the vehicle. However, in other embodiments, the planetary gear sets may be positioned axially outboard of the electrical machines and, in some instances, the engine, electrical machines, and/or planetary gear sets may not be coaxially arranged.

A second clutch 276 may be coupled to the sun gear 260 of the first electrical machine 216. The second clutch 276 is configured to couple and decouple a second mechanical PTO 278 from the first planetary gear set 226 and the first electrical machine 216, correspondingly. The second mechanical PTO 278 is positioned axially outboard from the region between the first electrical machine 216 and the second electrical machine 218, in the illustrated example. In this way, the second mechanical PTO may be easily and efficiently assembled, accessed, and maintained. However, other positions of the second mechanical PTO and corresponding clutch have been contemplated.

The second mechanical PTO 278 may be coupled to one or more accessories 280. The accessories 280 may include a liquid pump, a vacuum pump, a blower, an air compressor, a bed lift, and the like. In one example, the first and second mechanical PTOs 212, 278 may have different power rating and speed set-points. In one example, the accessories 280 coupled to the second mechanical PTO 278 may be different from the accessories 220 coupled to the first mechanical PTO 212. For instance, the accessories 280 coupled to the second mechanical PTO 278 may have a variance in desired torque input ranges. Furthermore, it will be appreciated that in certain scenarios both the first and second mechanical PTOs 212, 278 may power the accessories 220, 280 in tandem. In this way, the vehicle 202 may provide concurrent accessory-drive functionality, if desired, thereby increasing the vehicle's accessory capabilities and customer satisfaction, correspondingly.

The transmission system 200 may further include a third gear 282 coupled to the ring gear 238 of the second planetary gear set 232 via the interface 252. A third clutch 284 coupled to the third gear 282 may be configured to selectively couple/decouple the third gear 282 from a carrier 286 in a third planetary gear set 288 of the IAD 250. The third planetary gear set 288 further comprises a plurality of planet gears 289, a ring gear 290, and a sun gear 291. Additionally, the rotational axis of the IAD is radially offset but parallel to the rotational axis of the first and second planetary gears and the electrical machines, in the illustrated example. In this way, the IAD may be efficiently rotationally coupled to gears in the planetary gear sets. However, other relative positions between IAD and the planetary gear sets have been envisioned.

The transmission system 200 may also include an output shaft 292 for a first axle 299 (e.g., rear axle). It will be appreciated that the first axle 299 may be rotationally coupled to at least two drive wheels. The output shaft 292 is shown coupled to the ring gear 290 in the third planetary gear set 288 of the IAD 250. However, other arrangements of the output shaft and the ring gear have been envisioned.

The carrier 286 is coupled to a fourth clutch 293 via a carrier shaft 294. The fourth clutch 293 is coupled to a fourth gear 298 rotationally coupled to the interface 248, in the illustrated embodiment. Additionally, as depicted in FIG. 2, the fourth clutch 293 is configured to connect/disconnect the carrier 286 from the interface 248 of the first planetary gear set 226. In this way, the third planetary gear set 288 may be selectively coupled/decoupled from the first planetary gear set 226. However, other arrangements of the IAD 250 may be used, in other embodiments. A fifth clutch 295 may also be included in the IAD 250. The fifth clutch 295 is configured to couple/decouple the sun gear 291 from the carrier 286 in the third planetary gear set 288, so as to eliminate speed differentiation between the first and second axles. Additionally, in the IAD 250, the sun gear 291 is coupled to a second axle 296 via a shaft 297.

The IAD 250 is configured to provide torque to both the first axle 299 and the second axle 296, while allowing the wheels of both axles to rotate at different speeds, in one configuration. The transmission system 200 may also include the fifth clutch 295, functioning as a locking device configured to lock the rotational output delivered to the front and rear axles via the IAD 250. Put another way, speed differentiation between the two axles is selectively enabled and disabled via operation of the fifth clutch 295. The speed of the axles may be locked when a wheel slip condition occurs in the front or rear axle wheels or responsive to receiving a driver input indicative of a request to prevent speed differentiation between the front and rear axles. The driver input may be generated in response to driver interaction with an input device such as a button, switch, touch interface, and the like. Control strategies for the IAD are described in greater detail herein with regard to FIG. 4.

It will be understood that a controller (e.g., the controller 152) may send command signals to any of the first clutch 228, second clutch 276, third clutch 284, fourth clutch 293, fifth clutch 295, brake 240, engine 204, electrical energy storage device 266, inverter 268, electrical PTO 270, first mechanical PTO 212, and second mechanical PTO 278. Thus, the controllable components may include actuators to facilitate component adjustment, as previously discussed. It will be appreciated, that in one example, the controller may send control signals to the inverter which then control the first and second electrical machines 216, 218. The control strategies for the IAD are expanded upon below with regard to FIG. 4.

FIG. 3 shows another example of a transmission system 300 in a vehicle 302. The transmission system 300 includes several components included in the transmission system 200, shown in FIG. 2, such as a first planetary gear set 304, a second planetary gear set 306, a first electrical machine 308, a second electrical machine 310, a second mechanical PTO 312, an electrical PTO 314, and an IAD 316. These common components may have a similar structure and function. As such, redundant description of these components is omitted for brevity. However, the vehicle 302 shown in FIG. 3 is a battery electric vehicle (BEV) where an engine is omitted. Instead, a first mechanical PTO 318 is coupled to a shaft 320. The shaft 320 is rotationally coupled to a sun gear in the first planetary gear set. In one example, a clutch may be provided between the first mechanical PTO 318 and the shaft 320 configured to selectively couple the mechanical PTO to the shaft. In this way, the PTO functionality in the BEV is expanded, allowing additional accessories to be driven by the transmission, if wanted. The mechanical PTOs 318, 312 are shown positioned axially outboard from the region between the first electrical machine 308 and the second electrical machine 310. Consequently, both PTOs may be efficiently assembled, accessed, and maintained, thereby reducing transmission manufacturing and maintenance costs.

FIG. 4 shows a method 400 for operation of an IAD in a transmission system. The method 400 may be implemented by any of the IADs described above with regard to FIGS. 1-3. However, in other examples, the method may be implemented by other suitable IADs. At least a portion of the method steps may be implemented as instructions stored in non-transitory memory executable by a processor in a controller (e.g., controller 152, shown in FIG. 1).

At 402, the method determines operating conditions. These operating conditions may include wheel speed, engine speed, wheel traction, pedal position, vehicle load, clutch configurations, input device configuration, etc. It will be understood that the aforementioned conditions may be ascertained from sensor inputs, using modeled data, etc.

Next at 404, the method determines if a wheel slip condition is occurring or if a driver input indicating a desire to lock the IAD have been received by the controller. A wheel slip condition may be determined based on wheel speed, a traction modeling algorithm, etc. For instance, if the speed of a set of wheels increases beyond a threshold value it may be determined a wheel slip condition is occurring. It will be appreciated that the threshold value may be a non-zero number calculated based on electric motor output, engine output, transmission configuration, etc. However, in other examples, it may be determined that a wheel slip condition is occurring when the variance between wheel speed exceeds a threshold value. It will also be appreciated that the driver input may be generated in response to driver interaction with an input device such as a button, switch, touch interface, and the like.

If it is determined that the wheel slip condition is not occurring or a driver input indicating a desire to lock the IAD has not been received (NO at 404) the method proceeds to 406. At 406, the method includes enabling speed differentiation between the first axle and the second axle. To allow the speed differentiation between the axles, a clutch operating as a locking device for the IAD is opened or if the clutch is already open, the opened state is sustained.

Conversely, if it is determined that a wheel slip condition is occurring or a driver input indicating a desire to lock the IAD has been received (YES at 404) the method includes at 408 preventing speed differentiation between the first axle and the second axle. To prevent the speed differentiation between the axles, the clutch operating as the IAD locking device is closed. In this way, the speed of the front and rear axles is locked to recover from a traction loss event or reduce the likelihood of the wheels loosing traction, for instance. Wheel traction can therefore be increased during low traction conditions (e.g., wet, icy, and/or muddy road conditions).

The technical effect of the methods for operating the IAD described herein is increasing vehicle traction via selectively enabling and disabling speed differentiation between the two axles.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a vehicle transmission system is provided that comprises a first planetary gear set rotationally coupled to a second planetary gear set; a first electrical machine rotationally coupled to a sun gear in the first planetary gear set; a second electrical machine rotationally coupled to a sun gear in the second planetary gear set; an inter-axle differential including a third planetary gear set rotationally coupled to a first axle and a second axle and selectively rotationally coupled to the first planetary gear set and the second planetary gear set; wherein the inter-axle differential is configured to selectively enable and disable speed differentiation between the first and second axles.

In another aspect, a method is provided that comprises operating an inter-axle differential to selectively enable speed differentiation between a front axle and a rear axle based on one or more vehicle operating conditions; wherein the inter-axle differential is included in a vehicle transmission system that comprises: a first planetary gear set rotationally coupled to a second planetary gear set; a first electrical machine rotationally coupled to a sun gear in the first planetary gear set; a second electrical machine rotationally coupled to a sun gear in the second planetary gear set; and the inter-axle differential including a third planetary gear set selectively rotationally coupled to the first planetary gear set and the second planetary gear set. The method may further comprise, in one example, operating the inter-axle differential to disable speed differentiation between the front axle and the rear axle.

In yet another aspect, an electro-mechanical infinitely variable transmission (EMIVT) system is provided that comprises a first planetary gear set rotationally coupled to a second planetary gear set; a first electrical machine rotationally coupled to a sun gear in the first planetary gear set; a second electrical machine rotationally coupled to a sun gear in the second planetary gear set, wherein the first and second electrical machines are configured to rotationally couple to an internal combustion engine; a first mechanical power take-off rotationally coupled to the internal combustion engine through a countershaft gear; and a second mechanical power take-off coupled to a clutch configured to rotationally couple and decouple the second electrical machine from the second mechanical power take-off.

In any of the aspects or combinations of the aspects, the vehicle transmission system may further comprise a controller including executable instructions stored in non-transitory memory that cause the controller to: operate the inter-axle differential to enable speed differentiation between the first axle and the second axle based on one or more vehicle operating conditions.

In any of the aspects or combinations of the aspects, the controller may further include executable instructions stored in the non-transitory memory that cause the controller to: operate the inter-axle differential to inhibit speed differentiation between the first axle and the second axle.

In any of the aspects or combinations of the aspects, operating the inter-axle differential to inhibit speed differentiation between the first axle and the second axle may be implemented responsive to determining a wheel slip condition or receiving a driver input.

In any of the aspects or combinations of the aspects, the first and second planetary gear sets may be rotationally coupled to an internal combustion engine.

In any of the aspects or combinations of the aspects, the vehicle transmission system may further comprise a first mechanical power take-off rotationally coupled to an input shaft through a countershaft gear.

In any of the aspects or combinations of the aspects, the vehicle transmission system may further comprise a second mechanical power take-off coupled to a clutch configured to rotationally couple and decouple the second electrical machine from the second mechanical power take-off.

In any of the aspects or combinations of the aspects, the vehicle transmission system may further comprise an electrical power take-off electrically coupled to the first electrical machine and the second electrical machine.

In any of the aspects or combinations of the aspects, the vehicle transmission may be an electro-mechanical infinitely variable transmission.

In any of the aspects or combinations of the aspects, the first axle may be a front axle and the second axle may be a rear axle.

In any of the aspects or combinations of the aspects, locking the inter-axle differential may be implemented responsive to determining an occurrence of a wheel slip condition or receiving a driver input.

In any of the aspects or combinations of the aspects, the vehicle transmission system may further comprise a first mechanical power take-off rotationally coupled to an input shaft through a countershaft gear; and a second mechanical power take-off coupled to a clutch configured to rotationally couple and decouple the second planetary gear set from the second mechanical power take-off.

In any of the aspects or combinations of the aspects, the EMIVT system may further comprise an electrical power take-off electrically coupled to an inverter and wherein the inverter is electrically coupled to the first and second electrical machines.

In any of the aspects or combinations of the aspects, the EMIVT system may further comprise an inter-axle differential including a third planetary gear set rotationally coupled to a front axle and a rear axle, selectively rotationally coupled to the first planetary gear set and the second planetary gear set, and configured to allow for speed differentiation between the front and rear axle.

In any of the aspects or combinations of the aspects, the EMIVT system may further comprise a controller including executable instructions stored in non-transitory memory that cause the controller to: during a first operating condition, operate the inter-axle differential to enable speed differentiation between the front axle and the rear axle; and during a second operating condition, operate the inter-axle differential to inhibit speed differentiation between the front axle and the rear axle.

In another representation, a vehicle drivetrain is provided that comprises an EMIVT including: a pair of electric motor-generators; a pair of planetary gear sets each attached to a rotor of a corresponding one of the electric motor-generators; and a plurality of accessory PTOs configured to flow power therebetween, wherein the power flow is reversible and can be zero.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electrical machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle transmission system comprising:
   a first planetary gear set rotationally coupled to a second planetary gear set;
   a first electrical machine rotationally coupled to a sun gear in the first planetary gear set;
   a second electrical machine rotationally coupled to a sun gear in the second planetary gear set;
   an inter-axle differential including a third planetary gear set rotationally coupled to a first axle and a second axle and selectively rotationally coupled to the first planetary gear set and the second planetary gear set;
   a first mechanical power take-off rotationally coupled to an input shaft through a countershaft gear; and
   a second mechanical power take-off coupled to a clutch configured to rotationally couple and decouple the first electrical machine from the second mechanical power take-off;
   wherein the inter-axle differential is configured to selectively enable and disable speed differentiation between the first and second axles; and
   wherein the first and second planetary gear sets are rotationally coupled to an internal combustion engine.

2. The vehicle transmission system of claim 1, further comprising a controller including executable instructions stored in non-transitory memory that cause the controller to:
   operate the inter-axle differential to enable speed differentiation between the first axle and the second axle based on one or more vehicle operating conditions.

3. The vehicle transmission system of claim 2, wherein the controller further includes executable instructions stored in the non-transitory memory that cause the controller to:
operate the inter-axle differential to inhibit speed differentiation between the first axle and the second axle.

4. The vehicle transmission system of claim 3, wherein operating the inter-axle differential to inhibit speed differentiation between the first axle and the second axle is implemented responsive to determining a wheel slip condition or receiving a driver input.

5. The vehicle transmission system of claim 1, further comprising an electrical power take-off electrically coupled to an inverter, wherein the inverter is electrically coupled to the first and second electrical machines.

6. The vehicle transmission system of claim 1, wherein the first axle is a front axle and the second axle is a rear axle.

7. A method for operation of a vehicle transmission system, comprising:
operating an inter-axle differential to selectively enable speed differentiation between a front axle and a rear axle based on one or more vehicle operating conditions;
wherein the inter-axle differential is included in the vehicle transmission system that comprises:
a first planetary gear set rotationally coupled to a second planetary gear set;
a first electrical machine rotationally coupled to a sun gear in the first planetary gear set;
a second electrical machine rotationally coupled to a sun gear in the second planetary gear set; and
the inter-axle differential including a third planetary gear set selectively rotationally coupled to the first planetary gear set and the second planetary gear set;
wherein the vehicle transmission system further comprises:
a first mechanical power take-off rotationally coupled to an input shaft through a countershaft gear; and
a second mechanical power take-off coupled to a clutch configured to rotationally couple and decouple the first planetary gear set from the second mechanical power take-off.

8. The method of claim 7, further comprising operating the inter-axle differential to disable speed differentiation between the front axle and the rear axle.

9. The method of claim 8, wherein operating the inter-axle differential to disable speed differentiation between the front axle and the rear axle is implemented responsive to determining an occurrence of a wheel slip condition or receiving a driver input.

10. The method of claim 7, further comprising an electrical power take-off electrically coupled to the first electrical machine and the second electrical machine.

11. The method of claim 7, wherein the vehicle transmission system is an electro-mechanical infinitely variable transmission (EMIVT) system.

12. An electro-mechanical infinitely variable transmission (EMIVT) system, comprising:
a first planetary gear set rotationally coupled to a second planetary gear set;
a first electrical machine rotationally coupled to a sun gear in the first planetary gear set;
a second electrical machine rotationally coupled to a sun gear in the second planetary gear set, wherein the first and second electrical machines are configured to rotationally couple to an internal combustion engine;
a first mechanical power take-off rotationally coupled to the engine through a countershaft gear;
a second mechanical power take-off coupled to a clutch configured to rotationally couple and decouple the first electrical machine from the second mechanical power take-off; and
an inter-axle differential including a third planetary gear set rotationally coupled to a front axle and a rear axle, selectively rotationally coupled the first planetary gear set and the second planetary gear set, and configured to enable and disable speed differentiation between the front axle and the rear axle.

13. The EMIVT system of claim 12, further comprising an electrical power take-off electrically coupled to the first electrical machine and the second electrical machine.

14. The EMIVT system of claim 12, further comprising a controller including executable instructions stored in non-transitory memory that cause the controller to:
during a first operating condition, operate the inter-axle differential to enable speed differentiation between the front axle and the rear axle; and
during a second operating condition, operate the inter-axle differential to inhibit speed differentiation between the front axle and the rear axle.

* * * * *